(12) United States Patent
Scholz et al.

(10) Patent No.: US 10,020,762 B2
(45) Date of Patent: Jul. 10, 2018

(54) METHOD OF OPERATING A BRUSHED COMMUTATOR MOTOR OF AN ADJUSTING DRIVE, AND ADJUSTING DRIVE

(71) Applicant: BROSE FAHRZEUGTEILE GMBH & CO. KOMMANDITGESELLSCHAFT, BAMBERG, BAMBERG (DE)

(72) Inventors: Marcus Scholz, Lichtenfels (DE); Joerg Uebelein, Grub am Forst (DE); Christian Thomann, Burgebrach (DE); Thomas Weingaertner, Memmelsdorf (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 15/370,780

(22) Filed: Dec. 6, 2016

(65) Prior Publication Data
US 2017/0085198 A1 Mar. 23, 2017

Related U.S. Application Data

(63) Continuation of application No. PCT/EP2015/062533, filed on Jun. 5, 2015.

(30) Foreign Application Priority Data

Jun. 6, 2014 (DE) .......... 10 2014 008 462

(51) Int. Cl.
*H02P 7/285* (2016.01)
*H02P 7/28* (2016.01)
(Continued)

(52) U.S. Cl.
CPC ............ *H02P 7/285* (2013.01); *E05F 15/697* (2015.01); *H02P 7/2805* (2013.01); *H02P 29/50* (2016.02);
(Continued)

(58) Field of Classification Search
CPC .... H02P 6/10; H02P 29/50; H02P 6/16; H02P 25/098; H02P 7/2805; H02P 7/285
See application file for complete search history.

(56) References Cited

U.S. PATENT DOCUMENTS 3,631,529 A * 12/1971 Ohyama ............ G11B 23/0007
388/816
4,857,814 A * 8/1989 Duncan ................ D06F 37/306
318/281
(Continued)

FOREIGN PATENT DOCUMENTS

DE   19982964 T1   4/2001
DE   10124614 A1   11/2002
(Continued)

*Primary Examiner* — Bentsu Ro
*Assistant Examiner* — Thai Dinh
(74) *Attorney, Agent, or Firm* — Laurence A. Greenberg; Werner H. Stemer; Ralph E. Locher

(57) ABSTRACT

A method operates a brushed commutator motor of an adjusting drive in a motor vehicle, particularly a window lifter, having a rotor and having a stator. An angular position of the rotor with respect to the stator is determined. The angular position is used to determine a ripple within the torque, which ripple can be expected on the basis of the commutation. The motor current is adapted such that the amplitude of the ripple that can be expected remains below a determined limit value.

7 Claims, 3 Drawing Sheets

(51) Int. Cl.
*E05F 15/697* (2015.01)
*H02P 29/50* (2016.01)

(52) U.S. Cl.
CPC ....... *E05Y 2900/55* (2013.01); *H02P 2205/05* (2013.01)

(56) References Cited

U.S. PATENT DOCUMENTS

| | | | |
|---|---|---|---|
| 5,032,773 A | 7/1991 | Frank | |
| 5,221,881 A | 6/1993 | Cameron | |
| 5,428,276 A * | 6/1995 | Carobolante | H02P 6/10 318/400.04 |
| 5,798,624 A * | 8/1998 | Wilke | H02P 7/04 123/396 |
| 5,852,355 A | 12/1998 | Turner | |
| 5,886,489 A * | 3/1999 | Rowan | G11B 19/28 318/400.01 |
| 6,407,524 B1 | 6/2002 | Endo et al. | |
| 6,472,836 B1 * | 10/2002 | Uebelein | H02H 7/0851 318/434 |
| 6,967,459 B2 * | 11/2005 | Hahn | H02P 6/28 318/599 |
| 7,141,949 B2 * | 11/2006 | Harwood | H02P 6/182 318/400.35 |
| 7,474,067 B2 | 1/2009 | Ueda et al. | |
| 8,981,703 B2 * | 3/2015 | Bosch | H02P 6/142 318/400.12 |
| 9,106,178 B2 | 8/2015 | Han et al. | |
| 2011/0270558 A1 | 11/2011 | Knezevic et al. | |
| 2013/0043820 A1 | 2/2013 | Knezevic | |

FOREIGN PATENT DOCUMENTS

| | | |
|---|---|---|
| DE | 10231450 A1 | 1/2004 |
| EP | 0412180 A1 | 2/1991 |
| EP | 2704306 A2 | 5/2014 |
| KR | 1020140028772 A | 3/2014 |

* cited by examiner

METHOD OF OPERATING A BRUSHED COMMUTATOR MOTOR OF AN ADJUSTING DRIVE, AND ADJUSTING DRIVE

CROSS-REFERENCE TO RELATED APPLICATION

This is a continuation application, under 35 U.S.C. § 120, of copending international application No. PCT/EP2015/062533, filed Jun. 5, 2015, which designated the United States; this application also claims the priority, under 35 U.S.C. § 119, of German patent application No. 10 2014 008 462.0, filed Jun. 6, 2014; the prior applications are herewith incorporated by reference in their entirety.

BACKGROUND OF THE INVENTION

Field of the Invention

The invention relates to a method for operating a brushed commutator motor of an adjusting drive, and to an adjusting drive of a motor vehicle having a commutator motor of this type. The adjusting drive is in particular a component of a window lifter.

Motor vehicles usually contain adjusting parts, by way of example side windows and/or a sliding roof, which can be opened and closed by an electromotive adjusting drive. Seats or at least parts thereof also contain an electromotive seat adjuster. The respective adjusting part is moved by a gear mechanism that is driven by an electric motor and is in the form in particular of a worm gear having a (drive-side) worm on the motor shaft and having a (driven-side) worm wheel. The gear mechanism is conventionally arranged in a gear mechanism housing and the electric motor is flanged to the gear mechanism housing by way of its motor housing (pole housing). The electric motor is usually fastened on its end face to the gear mechanism housing, wherein a shaft spigot, in other words the shaft end of the motor shaft of the electric motor that supports the drive-side gear mechanism part (shaft end-side worm), protrudes into the gear mechanism housing.

A brushed electric motor is usually used as the electric motor. Electric motors of this type contain a commutator having segments and also at least two brushes by which coils of a rotor of an electric motor are commutated and as a result the polarity of the coils is reversed. In so doing, the brushes that are produced from compressed carbon dust are arranged about the central commutator and lie in corresponding holders. The brushes are pressed against the commutator by the leaf springs that are fastened to the brushes and to the holders. As a result the brushes are in electrical contact with the commutator and brush over the commutator segments of the commutator during the operation of the motor.

As the brushes come into electrical contact with the respective subsequent commutator segment in the direction of rotation, the electrical resistance of the electric motor increases. As a result, the electrical current (motor current) that is flowing through the electric motor at this moment in time reduces. The electrical current continues to reduce until as a result of the rotation the brushes come back into electrical contact only with a single segment of the commutator segments. During this time period, the torque of the electric motor reduces and consequently the rotational speed of the electric motor also reduces, at least in the case of an adjusting part that is comparatively more difficult to move and a comparatively low level of inertia of the rotor. This leads to a negative acoustic impression and also a comparatively high demand and loading on the components of the adjusting drive.

SUMMARY OF THE INVENTION

The object of the invention is to provide a particularly suitable method for operating a brushed commutator motor of an adjusting drive of a motor vehicle and also a particularly suitable adjusting drive, wherein in particular the acoustic impression is improved.

The method is used to operate an electric motor of an adjusting drive of a motor vehicle. The adjusting drive is in particular a component of a window lifter, a sliding roof or an electric door or luggage compartment closing aid. In so doing, an adjusting part is moved along an adjustment path by the adjusting drive. The electric motor contains a commutator and also brushes that brush over the commutator segments of the commutator during operation. In other words, the electric motor is a brushed commutator motor. The brushes are a component of a brush system of a stator and the commutator is a component of a rotor of the electric motor. The rotor is arranged in particular within the stator. In other words, the electric motor is embodied as an inner rotor. The stator contains at least one permanent magnet that is embodied by way of example from a ferrite material.

For the operation, the two brushes are initially preferably energized, wherein for this purpose direct current is used in an expedient manner. In other words, the electric motor is a direct current motor. In a first working step, an angular position of the rotor is determined with respect to the stator. In so doing, the angle is suitably between 0° and 360°. In other words, it is not the number of rotations that is detected but rather in each case the fraction of a full rotation. An angular position of 0° is by way of example specified during the production process of the commutator motor and remains constant over the life cycle of the commutator motor. By way of example, in this case one of the brushes is in direct mechanical and/or electrical contact with a specific segment of the commutator. The angular position is used to determine an expected ripple in the torque that is delivered by the commutator motor. For this purpose, in particular a torque progression that is to be expected is determined and within the torque progression that is to be expected of the ripple that is to be expected. The term 'ripple' is understood to mean in this case in particular a harmonic within the torque progression whose frequency is a whole number multiple of the frequency at which the rotor rotates with respect to the stator. In this case, in particular the torque reduces in comparison to the desired torque. The ripple is produced on the basis of the commutation, in other words if one of the brushes is in electrical contact with two of the commutator segments. To summarize, the ripple is in particular a deviation from the desired torque, wherein the deviation is produced by means of the construction of the electric motor itself. The desired torque is constant in an expedient manner.

The angular position of the rotor with respect to the stator in which commutation occurs and below which the ripple occurs within the torque is known as a result of the construction of the electric motor and in particular of the commutator and also the brushes. With the assistance of the previously specified angular position that the rotor assumes with respect to the stator at the prevailing point in time, it is consequently known at which point in time in the future the ripple is to be expected within the torque. This is the point in time at which the angular position is determined plus the quotient of the angle difference between the angle of commutation and the prevailing angular position divided by the rotational speed at which the rotor is rotating with respect to the stator. As a result, the angular position is used to determine in particular the point in time at which the ripple within the torque is to be expected. In a further working step, the motor current, in other words the electrical current by which the brushes of the electric motor are energized, is adjusted in such a manner that the amplitude of the expected ripple remains below a specific threshold value. In particular, the threshold value is equal to zero or it is a specific percentage of the average torque of the electric motor that is currently set. By way of example, the threshold value is proportional to the motor current. For example, the percentage is less than or equal to 10%, 2% or 1%. In particular, the point in time is determined at which the ripple is expected and the motor current is essentially adjusted at this point in time. Alternatively, an adjustment is already performed earlier in a specific time period, which takes into consideration an inertia of the electric motor and its control. In an expedient manner, the duration of the adjustment procedure is comparatively short. In particular, the duration of the adjustment procedure is a fraction of the time period of one rotation of the rotor and preferably less than 10%, 5% or 2% thereof.

On the basis of adjusting the motor current, the expected ripple is removed completely from the torque progression or at least reduced therein. It is preferred that the torque progression is consequently essentially constant. The motor current is in particular increased so that an interruption in the torque as a result of an increased electrical resistance and as a result of the reduced current flow is compensated. In an expedient manner, the electrical voltage that is applied between the two brushes is increased at this point in time for a comparatively short time period.

On the basis of reducing the amplitude of the ripple, the torque progression of the commutator motor is smoothed, which reduces the forces that occur within the adjusting drive and consequently the serviceable life of the components of the adjusting drive is increased. In so doing, the rotational speed progression is in addition likewise smoothed so that the rotor contains essentially only a single frequency at which the rotor rotates with respect to the stator. As a result, the acoustic impression is that of an electric motor that is essentially running evenly and this improves its impression.

In an expedient manner, the determined angular position is also used to determine at least one further expected ripple within the torque progression, the expected ripple being displaced by way of example by 360° with respect to the already determined expected ripple. In other words, it is expected that the second ripple occurs or would occur after a full rotation of the rotor with respect to the stator. Appropriately, the motor current is also adjusted in the case of this expected ripple so as to prevent it occurring or at least to decrease its amplitude. In an expedient manner, the motor current is controlled periodically, wherein the period corresponds to that period at which the rotor rotates with respect to the stator. Appropriately, the motor current is controlled at a frequency that corresponds to a whole number multiple of the rotor frequency. The multiple is in this case appropriately the number of segments of the commutator. In so doing, the commutator segments are expediently constructed in a similar manner and comprise in particular the identical circular arc length.

To summarize, after determining the angular position for a specific time period essentially all expected ripples within the torque are determined and the motor current adjusted in such a manner that the amplitude of each expected ripple remains below the threshold value. In particular, for this purpose the rotational speed of the rotor is determined, wherein this is determined by way of example by determining the angular position. Appropriately, prior to determining the angular position, the angle is determined a further time and the time that has elapsed between the two points in time of the angle determination is ascertained. In other words, the angular position and also the time duration lying between the two determinations is determined twice and in so doing placed in a relationship so as to determine the rotational speed. Alternatively, the rotational speed of the rotor is determined by a sensor that detects by way of example the rotational speed of a further element, such as for example a gear wheel. In this manner, further sensors are not required, which leads to a reduction in production costs of the adjusting drive.

In a particularly suitable embodiment of the invention, the angular position is determined on the basis of a current ripple that is present within the motor current. As a result, the motor current is ascertained and checked for the presence of a current ripple, wherein a current ripple indicates a fluctuation or a peak within the motor current which is undesirable. It is preferred that a number of current ripples are used to determine the angular position. By way of example, the motor current is a direct current so that deviations from the constant value of the current with the exception of statistical fluctuations represent current ripples. Current ripples of this type occur as a result of the commutation and are essentially simultaneous to the ripples in the torque. By way of example, two current ripples are detected and the expected ripple in the torque is determined on the basis of the last current ripple with respect to the time period between the two current ripples. As an alternative thereto, only one of the current ripples is detected and by way of example the rotational speed is used to determine the point in time of the expected ripple in the torque. In particular, as the motor current is adjusted, the motor current itself is likewise smoothed so that the motor current does not contain a current ripple or that at least the emphasis of the current ripple is reduced.

In particular, the angular position is used to determine the number of expected ripples within the torque and the number of ripples is reduced by suitably controlling the motor current. It is preferred that the adjustment is performed for a first time period, wherein the time period is defined either by specific absolute points in time or by relative points in time that are determined by way of example on the basis of a determined angular position of the stator with respect to the rotor. In particular, a number of rotations of the rotor is used so as to determine the first time period. It is preferred that all expected ripples within the torque are reduced by adjusting the motor current. After the first time period has ended, the motor current is preferably not adjusted for a second time period, wherein the second time period is appropriately shorter than the first time period. For example, the second time period is less than or equal to the time period of one rotation of the rotor. As a result of not adjusting the motor current, the ripples within the torque and consequently also within the motor current are more pronounced than within the first time period. As a result, the procedure of determining the angular position within the second time period is simplified or at least more precise than within the first time period. Consequently, it is possible after the second time period has ended to repeat a procedure of adjusting the motor current, wherein the points in time of the expected ripples can be determined in a comparatively precise manner.

Appropriately, the angular position is not determined if the motor current is adjusted. In other words, the angular position is only determined if the motor current is not adjusted. The angular position is not determined in particular during the first time period insofar as this is present. On the contrary, all expected ripples within the torque are determined on the basis of determining the angular position prior to adjusting the motor current, by way of example on the basis of a single angular position. In this manner, it is also possible to select a comparatively small threshold value which leads to a comparatively homogenous torque progression without making it more difficult to determine further expected ripples or without making the determination procedures comparatively more susceptible to errors. By way of example, the angular position is determined only once during the operation of the adjusting drive.

In one alternative embodiment of the invention, a sensor signal is used to determine the angular position. The sensor signal is generated by a position sensor that determines the angular position of the rotor with respect to the stator during operation. Since the ripples within the torque progression occur at specific positions (angles) of the rotor with respect to the stator, the determination of the expected ripple is comparatively precise. In addition, the calculation work is reduced and the influence of errors as a result by way of example of defective models or defective calculation instructions is reduced. The point in time of the expected ripple is determined by a reference value.

The quotient of the reference value and the rotational speed of the rotor determines the time period that elapses between the sensor signal and the ripple or expected ripple occurring. In particular, an angle that corresponds to the circular arc of a segment of the commutator is used for this purpose as a reference value.

By way of example, a sensor containing a light barrier or a light barrier and a sensor wheel is used as a position sensor. However, it is particularly preferred that the position sensor functions in a manner based on the magneto-resistive effect. By way of example, the position sensor contains a Hall sensor or an AMR sensor that contains a comparatively high angle resolution. In particular, the position sensor contains an annular magnet that is preferably connected to the rotor. In so doing, the Hall sensor or AMR sensor is expediently fixed in place which simplifies the procedure of reading out the data and also simplifies the energizing procedure.

It is preferred that the reference value is stored in a non-volatile memory device of the motor electronic system and is read out from the non-volatile memory device during the procedure of determining the point in time of the expected ripple. By way of example, the electric motor is calibrated after its production and the reference value is determined using a test bench. Alternatively, the reference value is calculated on the basis of the construction of the electric motor. By reading out the reference value from the non-volatile memory device of the motor electronic system, the reference value is essentially available without delay and the motor current can be adjusted after capturing the first sensor signal of the position sensor.

As an alternative thereto, the reference value of a current ripple that is present in the motor current is determined, the current ripple being ascertained prior to adjusting the motor current. It is preferred that a number of current ripples are used to determine the reference value. The reference value is determined in that the point in time between the current ripple occurring and the subsequent ripple in the torque progression is multiplied by the rotation speed of the electric motor. This occurs in an expedient manner if the rotational speed of the electric motor is essentially constant. By way of example, after the procedure of energizing the electric motor has commenced, the reference value is determined within a first rotation of the electric motor. In this manner, the reference value is known comparatively quickly, and the expected ripple within the torque can be determined comparatively quickly. In an expedient manner, the procedure of determining the reference value is always repeated after the procedure of energizing the electric motor has commenced. In this manner, effects are taken into consideration that leads to a displacement of the sensor signals with respect to the point in time of the expected ripple. Effects of this type are by way of example a displacement of the components of the position sensor or possible wear to the brushes.

The adjusting drive of a motor vehicle contains a brushed commutator motor. In an expedient manner, the adjusting drive comprises a window lifter, a seat adjuster, an electrically-actuated tail gate or the like. The electric motor itself contains a rotor and a stator. By way of example, the rotor is arranged within the stator. In other words, the electric motor is embodied as an inner rotor. As an alternative thereto, the electric motor is an outer rotor. The stator contains a number of brushes, and the rotor contains a commutator having a number of commutator segments. In an expedient manner, the brushes are a component of a brush system and are embodied from compressed carbon dust.

During the operation of the adjusting drive, the angular position of a rotor of the electric motor with respect to a stator of the electric motor is determined in a first working step. In a further working step, the angular position is used to determine a ripple that is to be expected within the torque as a result of the commutation. In particular, the point in time of the expected ripple is determined. In a further working step, the motor current, in other words the current that is used to operate the electric motor, is adjusted in such a manner that the amplitude of the expected ripple remains below a specific threshold value. In other words, the deviation at the point in time of the ripple with respect to a predetermined torque is less that the specific threshold value. It is preferred that the electric motor contains a motor controller by which it is possible to set the motor current. In an expedient manner, the electronic system is used for this purpose, by which the rotational speed or the torque of the electric motor is predetermined so as to operate the electric motor in the proper manner.

By way of example, the electric motor contains a current sensor or a position sensor that contains by way of example a Hall sensor or an AMR sensor. In particular, in this case an annular magnet is connected to the rotor and fastened thereto in a non-rotatable manner. The stator of the commutator motor contains appropriately a number of permanent magnets that are arranged in a rotationally symmetrical manner with respect to the axis of rotation of the rotor. By way of example, the permanent magnets are embodied from iron or NdFeB.

Other features which are considered as characteristic for the invention are set forth in the appended claims.

Although the invention is illustrated and described herein as embodied in a method of operating a brushed commutator motor of an adjusting drive, and an adjusting drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
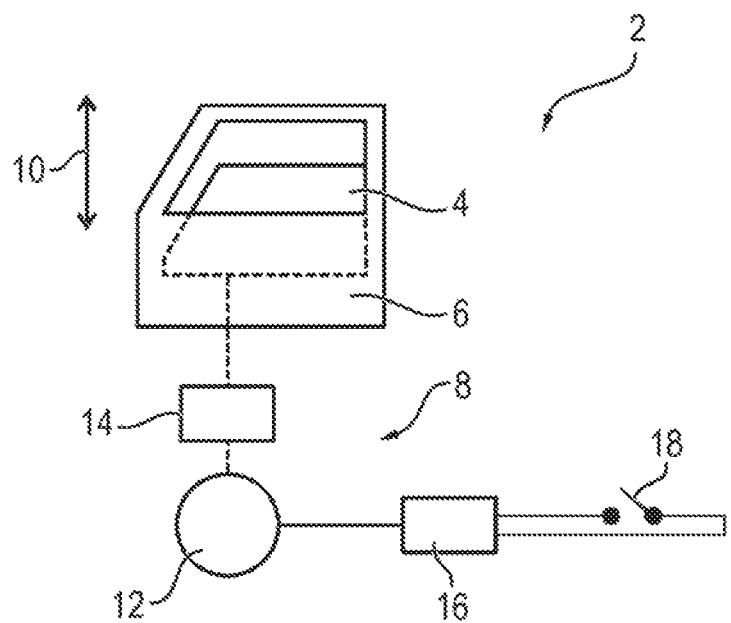
FIG. 1 is an illustration of a window lifter having a commutator motor according to the invention.

Mutually corresponding parts are provided with like reference numerals in all the figures.

Referring now to the figures of the drawings in detail and first, particularly to FIG. 1 thereof, there is shown schematically an electric window lifter 2 having a window pane 4, wherein the window lifter 2 is integrated into a door 6 of a motor vehicle. The window pane 4 is moved along an adjustment path 10 by an adjusting drive 8. The adjusting drive 8 contains an electric motor 12 on the shaft-side of which is arranged a worm gear 14 by which the rotational movement of the electric motor 12 is converted into a translation movement of the window pane 4. The electric motor 12 is supplied with electrical energy by a motor electronic system 16 as soon as an occupant of the motor vehicle starts an adjusting movement of the window pane 4 along the adjustment path 10 by actuating a switch 18. An anti-trap protection is integrated within the motor electronic system 16, also referred to as the control electronic system, wherein the anti-trap protection prevents an object that is located within the adjustment path 10 from becoming trapped by the window pane 4.

Figure 2:
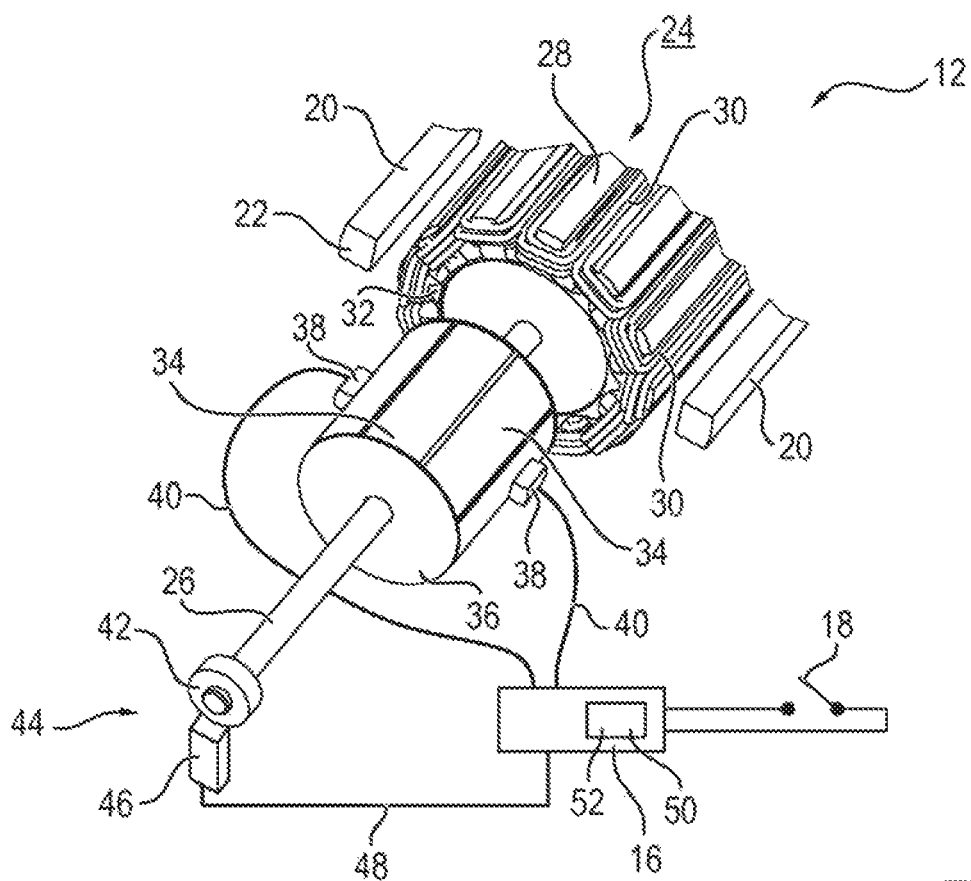
FIG. 2 is a diagrammatic, perspective view of a section of the commutator motor.

FIG. 2 illustrates a perspective view of a section of the electric motor 12 that is embodied as an inner rotor. The electric motor 12 contains a number of permanent magnets 20, of which two are illustrated. The permanent magnets 20 are a component of a stator 22 of the electric motor 12 and are held in position by a stack of laminations, not illustrated. A rotor 24 having a rotor shaft 26 is arranged within the stator 22 and a worm wheel, not illustrated, of the worm gear 14 is fastened to the rotor shaft. The rotor 24 contains an electromagnet structure 28 having a number of coils 30 that form the respective electromagnets. Each of the coils 30 is wound around a stack 32 of laminations that is fastened to the shaft 26 and electrically contacts two commutator segments 34 of a commutator 36, which for is part is connected in a non-rotatable manner to the rotor shaft 26. The commutator segments 34 differ from one another only as a result of their arrangement with respect to the rotor shaft 26, wherein the commutator segments 34 are offset with respect to one another in each case by a constant angle.

The commutator 36 is in electrical contact with two brushes 38 that brush over the commutator segments 34 during the operation of the electric motor 12. In so doing, each of the brush 38 is in electrical contact with the motor electronic system 16 by a stranded wire 40. An annular magnet 42 of a position sensor 44 is connected in a non-rotatable manner to the free end of the rotor shaft 26, the free end lying opposite the stack 32 of laminations. A position sensor 44 contains an AMR sensor 46 that is coupled to the motor electronic system by means of a line 48 so as to communicate signals. In an alternative embodiment, not illustrated here, the AMR sensor is replaced by a Hall sensor. The motor electronic system 16 contains a non-volatile memory device 50 that stores a reference value 52 during the production procedure of the adjusting drive 8.

Figure 3:
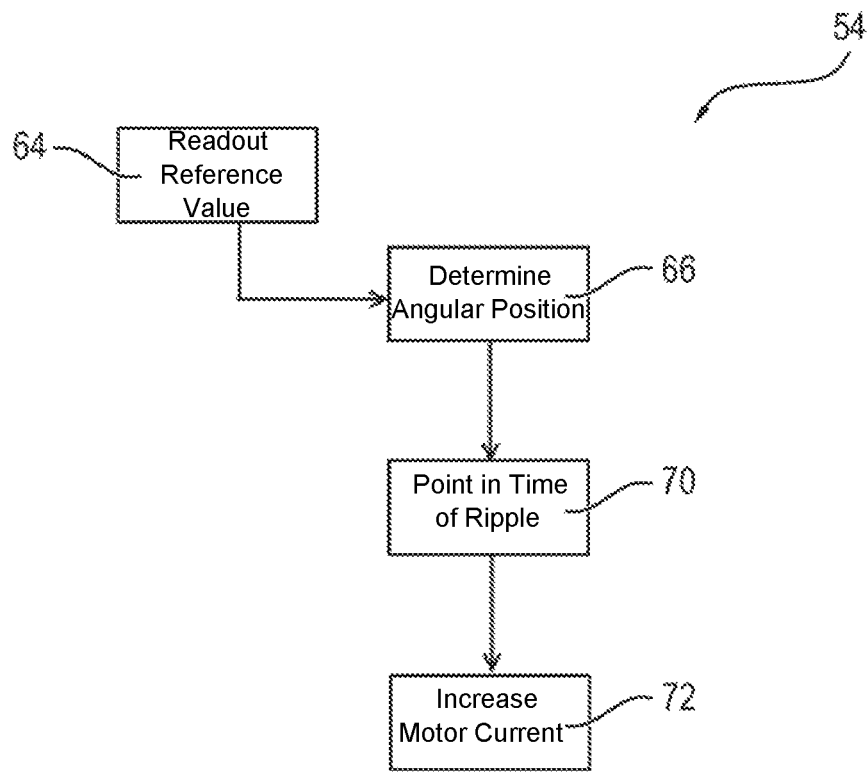
FIG. 3 is a flow chart illustrating a first method for operating the window lifter.

The motor electronic system 16 is provided so as to perform a method 54 for operating the commutator motor 12 and is illustrated schematically in FIG. 3. In so doing, a motor current I is adjusted, the motor current being provided by the motor electronic system 16 by way of the stranded wire 40 of the electromagnet structure 28. FIG. 5C illustrates a first motor current progression 54 with respect to time t, the first motor current progression being produced after actuating the switch 18 if an adjustment procedure in accordance with the method 54 is not performed. The motor current I is directly proportional to the torque M by means of which the window pane 4 is moved along the adjustment path 10. As a result, the first motor current progression 54 corresponds to a first torque progression 56, wherein the scaling is different.

As the rotor 24 rotates with respect to the stator 22, the brushes 38 brush over the commutator segments 34. As soon as the two brushes 38 are in electrical contact in each case with two of the commutator segments 34, two of the coils 30 of the electromagnet structure 28 are energized, the two coils being connected in parallel with one another. As a result, the ohmic resistance of the electric motor 12 increases which leads to an interruption in the motor current I and consequently also in the motor torque M. As a result, the first motor current progression 54 and the first torque progression 56 contain a number of current ripples 58 or ripples 60 of the torque M. As soon as the brushes 38 are in electrical contact in each case only with one of the commutator segments 34, an overshoot occurs as a result of the inductivity 30 so that a fluctuation is formed within the progressions 54, 56, wherein the frequency of the fluctuation is equal to the rotational speed n of the electric motor 12 multiplied by the number of segments 34.

Figure 5A:
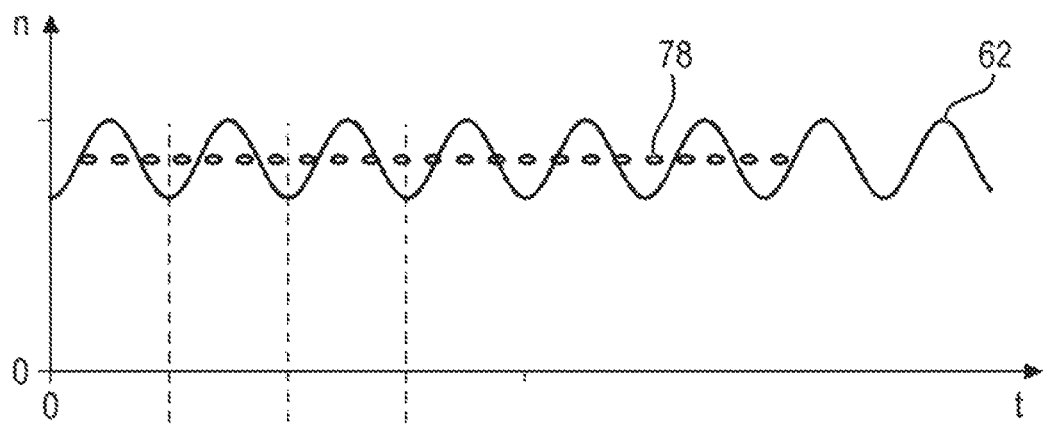
FIGS. 5A-5C are graphs illustrating progressions with respect to time of the rotational speed, motor current and sensor signal.

As a result of the comparatively constant load, namely of the window pane 4 and the essentially constant coefficient of friction along the adjustment path 10, the electric motor 12 contains in this case a first rotational speed progression 62 that is illustrated in FIG. 5a and corresponds essentially to the first motor current progression 54 or the first torque progression 56. In other words, the rotational speed n reduces at the point in time of the respective ripple 58, 60 and the first rotational speed progression 62 contains a fluctuation. As a result, the acoustic impression of the electric motor 12 deteriorates and the window pane 4 is not moved along the adjustment path at a constant rate. As a result, the worm gear 14 is loaded comparatively intensely as a result of the forces that occur owing to the alternating acceleration.

Figure 5B:
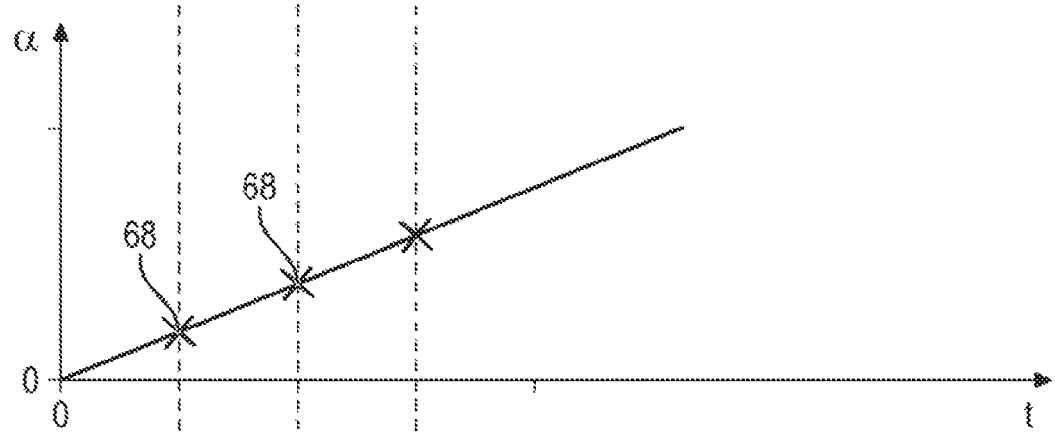
Figure 5C:
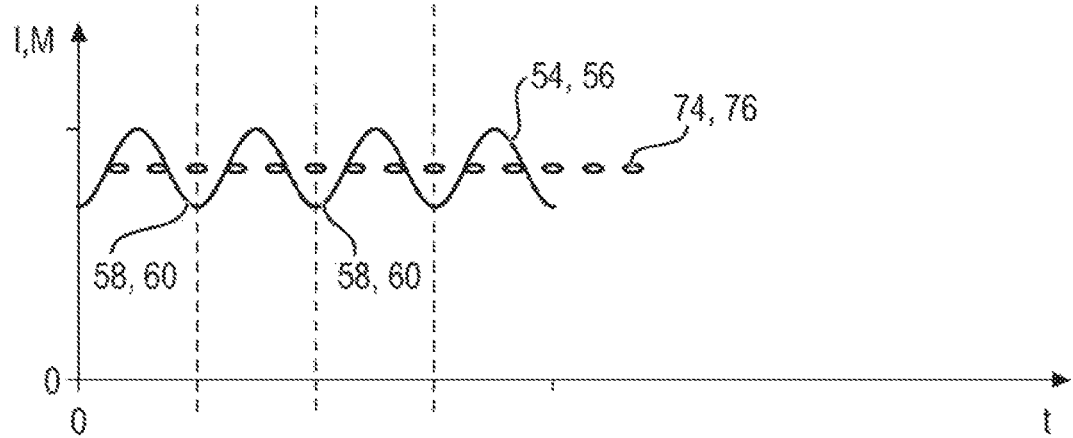

In order to prevent such fluctuations in the torque, the method 54 is performed in accordance with FIG. 3. In a first working step 64, the reference value 52 is read out from the memory device 50. The reference value 52 corresponds in this case to the angle that corresponds to the circle arc of each of the segments 34. In a second working step 66, an angular position α of the rotor 24 is determined with respect to the stator 22. For this purpose, a sensor signal 68 of the position sensor 44 is used and the progression with respect to time thereof is illustrated in FIG. 5B. The sensor signal 68 always occurs when commutation takes place, in other words if a ripple 60 is present in the torque M. After determining the angular position α, the point in time of the expected next ripple 60 is determined in a third working step 70, in that at the point in time of the sensor signal 68 the quotient of the reference value 52 and the rotational speed n is summed.

In a fourth working step 72, the motor current I is increased at this point in time. For this purpose, the electrical voltage that is applied at the two brushes 38 is temporarily increased by the motor electronic system 16. On the basis of the first angular position determination, all ripples 60 that are to be expected in the future are also compensated by adjusting the motor current I. In other words, the third working step 70 and also the fourth working step 72 are essentially repeated until the switch 18 is actuated so as to terminate the adjusting movement of the window pane 4. As an alternative thereto, the respective next ripple 60 is determined on the basis of each of the sensor signals 68. In other words, the second working step 66, the third working step 70 and also the fourth working step 72 are essentially continuously repeated.

As a result, an essentially constant second motor current progression 74 and also a second torque progression 76 that corresponds thereto and essentially does not comprise any ripples 58, 60 are produced. In other words, the amplitude of the ripples 60 is reduced to zero. Therefore, the resultant second rotational speed progression 78 is also essentially constant so that only a single frequency can be established by users of the window lifter 2.

Insofar as the reference value 52 is not stored in the memory device 50, the first working step 64 is modified. In so doing, both one of the sensor signals 68 and also the current ripple 58 that follows this sequentially are ascertained. The intermediate time period is multiplied by the corresponding rotation speed n so as to produce the reference value 52. In so doing, the reference value 52 is preferably only determined in the case of a first rotation of the rotor 24 and is stored in the memory device 50 that is embodied as a volatile memory device.

Figure 4:
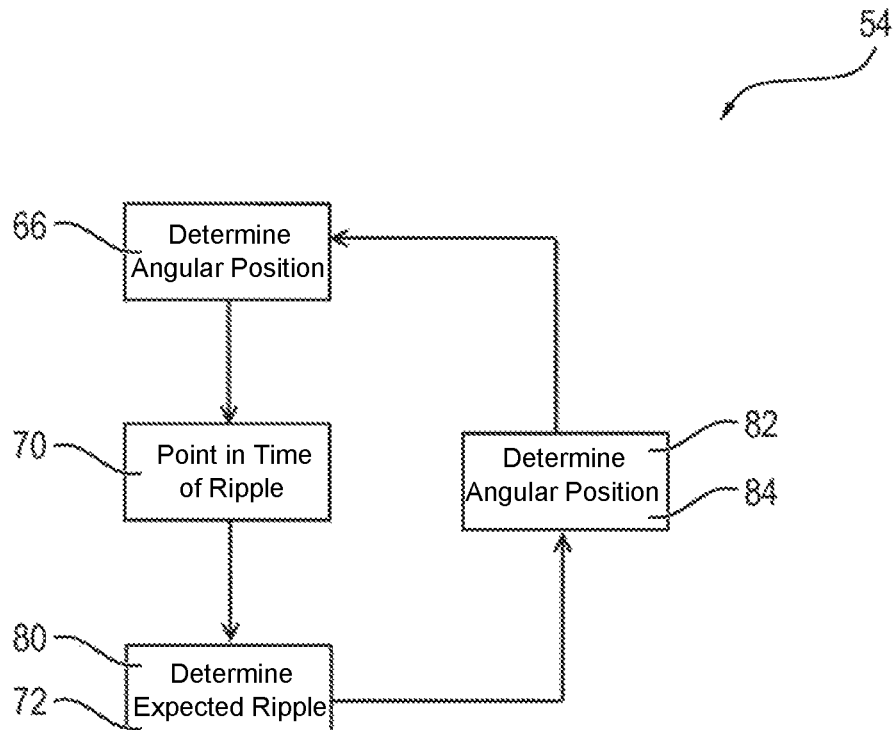
FIG. 4 is a flow chart illustrating schematically a second method for operating the window lifter.

FIG. 4 illustrates an alternative embodiment of the method 54, wherein the third working step 70 and the fourth working step 72 correspond to that illustrated in FIG. 3. This method 54 is used insofar as a position sensor 44 is not provided. The angular position α is determined in the second working step 66 by the current ripple 60 itself. In so doing, the time period between two sequential current ripples 60 is multiplied by the prevailing rotational speed n in order to set the reference value 52. Based on the prevailing point in time of the last ascertained current ripple 60, the quotient of the reference value 52 and the prevailing valid rotational speed n is summed in order to determine the point in time of the next ripple 58 within the torque M, which is performed in the third working step 70.

For a first time period 80, all expected ripples 60 are determined on the basis of an angular position α that has been determined once and the motor current I is accordingly adjusted. The first time period 80 corresponds in so doing by way of example to ten rotations of the rotor 24. Within the first time period 80, a further angular position determination is consequently not performed. After the first time period 80 has ended, the motor current I is not adjusted in a fifth working step 82 for a second time period 84. As a result, the current ripples 58 that correspond to the current ripples 60 occur again. Within the second time period 84, the angular position α is determined with the comparatively greatly pronounced current ripples 60 and consequently the reference value 52 is corrected.

The invention is not limited to the above described exemplary embodiments. On the contrary, other variants of the invention can also be derived therefrom by the person skilled in the art without departing from the subject matter of the invention. Moreover, in particular, all individual features that have been described in connection with the individual exemplary embodiments can also be combined with one another in other ways without departing from the subject matter of the invention.

The following is a summary list of reference numerals and the corresponding structure used in the above description of the invention:

2 Window lifter
4 Window pane
6 Door
8 Adjusting drive
10 Adjustment path
12 Electric motor
14 Worm gear
16 Motor electronic system
18 Switch
20 Permanent magnet
22 Stator
24 Rotor
26 Rotor shaft
28 Electromagnet structure
30 Coil
32 Stack of laminations
34 Commutator segment
36 Commutator
38 Brushes
40 Stranded wire
42 Annular magnet
44 Position sensor
46 AMR sensor
48 Line
50 Memory device
52 Reference value
54 First motor current progression
56 First torque progression
58 Current ripple
60 Ripple
62 First rotational speed progression
64 First working step
66 Second working step
68 Sensor signal
70 Third working step
72 Fourth working step
74 Second motor current progression
76 Second torque progression
78 Second rotational speed progression
80 First time period
82 Fifth working step
84 Second time period
n Rotational speed
t Time
I Motor current
M Torque
α Angular position

The invention claimed is:

1. A method for operating a brushed commutator motor of an adjusting drive of a motor vehicle, the brushed commutator motor having a rotor and a stator, which comprises the steps of:
   determining an angular position of the rotor with respect to the stator on a basis of a sensor signal of a position sensor;
   determining an expected ripple of a torque that is to be expected as a result of commutation from the angular position, a point in time of the expected ripple is determined from a point in time of the sensor signal and a quotient between a reference value and a rotational speed; and
   adjusting a motor current such that an amplitude of the expected ripple remains below a specific threshold value.

2. The method according to claim 1,
   wherein an angle that corresponds to a circle arc of a segment of a commutator is used as the reference value.

3. The method according to claim 2, which further comprises using one of an anisotropic magneto-resistive sensor or a Hall sensor as a component of the position sensor.

4. The method according to claim 2, which further comprises reading out the reference value from a non-volatile memory device of a motor electronic system.

5. The method according to claim 2, which further comprises determining the reference value on a basis of a current ripple that is present in the motor current prior to adjusting the motor current.

6. An adjusting drive of a motor vehicle, comprising:
   a position sensor outputting a sensor signal;
   a brushed commutator motor having a rotor and a stator and configured to:
      determine an angular position of said rotor with respect to said stator on a basis of the sensor signal of said position sensor;
      determine an expected ripple of a torque that is to be expected as a result of commutation from the angular position, a point in time of the expected ripple is determined from a point in time of the sensor signal and a quotient between a reference value and a rotational speed; and
      adjusting a motor current such that an amplitude of the expected ripple remains below a specific threshold value.

7. The adjusting drive according to claim 6, wherein the adjusting drive is a window lifter.

* * * * *